US012608075B2

(12) United States Patent
Ayuba et al.

(10) Patent No.:  US 12,608,075 B2
(45) Date of Patent:      Apr. 21, 2026

(54) VR PARTIAL PASSTHROUGH USING CONTOUR APPROXIMATION

(71) Applicant: INTERNATIONAL BUSINESS MACHINES CORPORATION, Armonk, NY (US)

(72) Inventors: Sho Ayuba, Tokyo (JP); Chisa Koriyama, Bunkyo-ku (JP); Kazuki Matsumaru, Higashimurayama (JP); Akinobu Morishima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 18/500,619

(22) Filed: Nov. 2, 2023

(65) Prior Publication Data

US 2025/0147573 A1      May 8, 2025

(51) Int. Cl.
| | |
|---|---|
| *G06F 3/01* | (2006.01) |
| *G06T 19/00* | (2011.01) |
| *G06T 19/20* | (2011.01) |
| *G06V 10/75* | (2022.01) |
| *G06V 20/64* | (2022.01) |

(52) U.S. Cl.
CPC ............ *G06F 3/011* (2013.01); *G06T 19/006* (2013.01); *G06T 19/20* (2013.01); *G06V 10/752* (2022.01); *G06V 20/64* (2022.01); *G06T 2219/2004* (2013.01)

(58) Field of Classification Search
CPC ...... G06V 10/752; G06V 20/64; G06V 20/20;
G06V 40/168; G06F 3/011; G06F 3/017;
G06F 3/04815; G06T 19/20; G06T
19/006; G06T 2219/2004; G06T 2200/24
See application file for complete search history.

(56) References Cited

U.S. PATENT DOCUMENTS

| | | | |
|---|---|---|---|
| 11,009,716 | B2 | 5/2021 | Kiemele |
| 2016/0027215 | A1 | 1/2016 | Burns |

(Continued)

FOREIGN PATENT DOCUMENTS

| | | |
|---|---|---|
| WO | 2017201191 A1 | 11/2017 |
| WO | 2020219601 A1 | 10/2020 |

OTHER PUBLICATIONS

Intel, "Demystifying the Virtual Reality Landscape," Intel [online], [accessed on Jul. 24, 2023], 4 pages, Retrieved from the Internet: <URL: https://www.intel.com/content/www/us/en/tech-tips-and-tricks/virtual-reality-vs-augmented-reality.html>.

(Continued)

*Primary Examiner* — Xilin Guo

(74) *Attorney, Agent, or Firm* — Daniel M. Yeates

(57) ABSTRACT

According to at least one embodiment, a method, a computer system, and a computer program product for virtual reality is provided. The present invention may include detecting a selection of a real-world object via a passthrough function of a virtual reality headset; analyzing a contour of the selected real-world object via a contour approximation method; creating a first layer that maintains passthrough function within the analyzed contour of the selected real-world object; creating a second layer that comprises a virtual simulated environment and one or more virtual objects; and displaying the first layer on top of the second layer by overwrapping the first layer and the second layer.

17 Claims, 4 Drawing Sheets

(56) References Cited

U.S. PATENT DOCUMENTS

| | | | |
|---|---|---|---|
| 2018/0004286 A1 | 1/2018 | Chen | |
| 2019/0020843 A1 | 1/2019 | Reif | |
| 2019/0385372 A1 | 12/2019 | Cartwright | |
| 2021/0132683 A1* | 5/2021 | Herling | G02B 27/0093 |
| 2024/0104849 A1* | 3/2024 | Nie | G06T 19/00 |
| 2024/0303940 A1* | 9/2024 | Bataille | H04N 7/147 |
| 2025/0104363 A1* | 3/2025 | Faaborg | G06T 5/70 |
| 2025/0111619 A1* | 4/2025 | Singh | G06T 19/006 |

OTHER PUBLICATIONS

Melnick, "Microsoft Files Patent to Bring Real-World Objects to VR," VRScout [news], May 19, 2021 [accessed on Jul. 24, 2023], 8 pages, Retrieved from the Internet: <URL: https://vrscout.com/news/microsoft-patent-real-world-objects-to-vr/#>.
Nakano, et al., "Ukemochi: A Video See-through Food Overlay System for Eating Experience in the Metaverse," CHI EA '22: Extended Abstracts of the 2022 CHI Conference on Human Factors in Computing Systems, Apr. 2022, 8 pages, Article No. 380, ACM, Retrieved from the Internet: <https://doi.org/10.1145/3491101.3519779>.
Nishida, I was surprised at the practicality when I wrote a manuscript in a VR space Advantages and problems of "virtual work", ITmedia News [online], Nov. 26, 2021 [accessed on Jul. 24, 2023], 6 pages, Retrieved from the Internet: <URL: https://www.itmedia.co.jp/news/articles/2111/26/news193_2.html>.
Oculus VR, "Mixed Reality with Passthrough," Meta Quest [online], Jul. 23, 2021 [Jul. 24, 2023], 4 pages, Retrieved from the Internet: <URL: https://developer.oculus.com/blog/mixed-reality-with-passthrough/>.
Pai, "Oculus Passthrough: Surface Projected and Selective Passthrough," immersive insiders [online blog], Jun. 2022 [accessed on Jul. 24, 2023], 17 pages, Retrieved from the Internet: <URL: https://blog.immersive-insiders.com/oculus-passthrough-surface-projected-and-selective-passthrough/>.
Palli, "Real World Meets Virtual World? Meta to Introduce Mixed Reality Soon," Mashable India [online], Feb. 22, 2022 [accessed on Jul. 24, 2023], 7 pages, Retrieved from the Internet: <URL: https://in.mashable.com/tech/27813/real-world-meets-virtual-world-meta-to-introduce-mixed-reality-soon>.
Rubin, "Meta (Facebook)'s VR conferencing app "Horizon Workrooms" will be the third pillar of the Metaverse," Wired [online], Nov. 10, 2021 [accessed on Jul. 24, 2023], 6 pages, Retrieved from Internet: <URL: https://wired.jp/membership/2021/11/10/facebook-meta-horizon-workrooms-metaverse/>.
Screen captures from YouTube video clip entitled "OpenCV GSOC 2014," 2 pages, uploaded on Mar. 23, 2015 by OpenCV, Retrieved from the Internet: <URL: https://www.youtube.com/watch?v=3f76HCHJJRA>.
Strange, "Disney experiment lets you catch real objects while in VR," Mashable [online], Mar. 20, 2017 [accessed on Jul. 24, 2023], 8 pages, Retrieved from the Internet: <URL: https://mashable.com/article/vr-catching-real-ball-disney-research>.
Taylor, et al., "Interacting with Real Objects in Virtual Worlds," Real VR—Immersive Digital Reality: How to Import the Real World into Head-Mounted Immersive Displays [chapter], Mar. 3, 2020, pp. 337-353, Springer International Publishing, DOI: 10.1007/978-3-030-41816-8_15, Retrieved from the Internet: <URL: https://link.springer.com/chapter/10.1007/978-3-030-41816-8_15>.
Wikipedia, "Mirror world", Wikipedia, the free encyclopedia, [accessed on Jul. 24, 2023], 4 Pages, Retrieved from the Internet: <URL: https://en.wikipedia.org/wiki/Mirror_world>.
Tolya Talamanov, "opencv," (Version 438.0), Jul. 30, 2023, 2 Pages, URL: https://github.com/opencv/opencv.

* cited by examiner

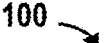

100

CLIENT COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

VIRTUAL REALITY (VR) PARTIAL PASSTHROUGH DETERMINATION CODE                    200

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOT PHYSICAL MACHINE SET 142 |
| VIRTUAL MACHINE SET 143 | CONTAINER SET 144 |

FIGURE 1

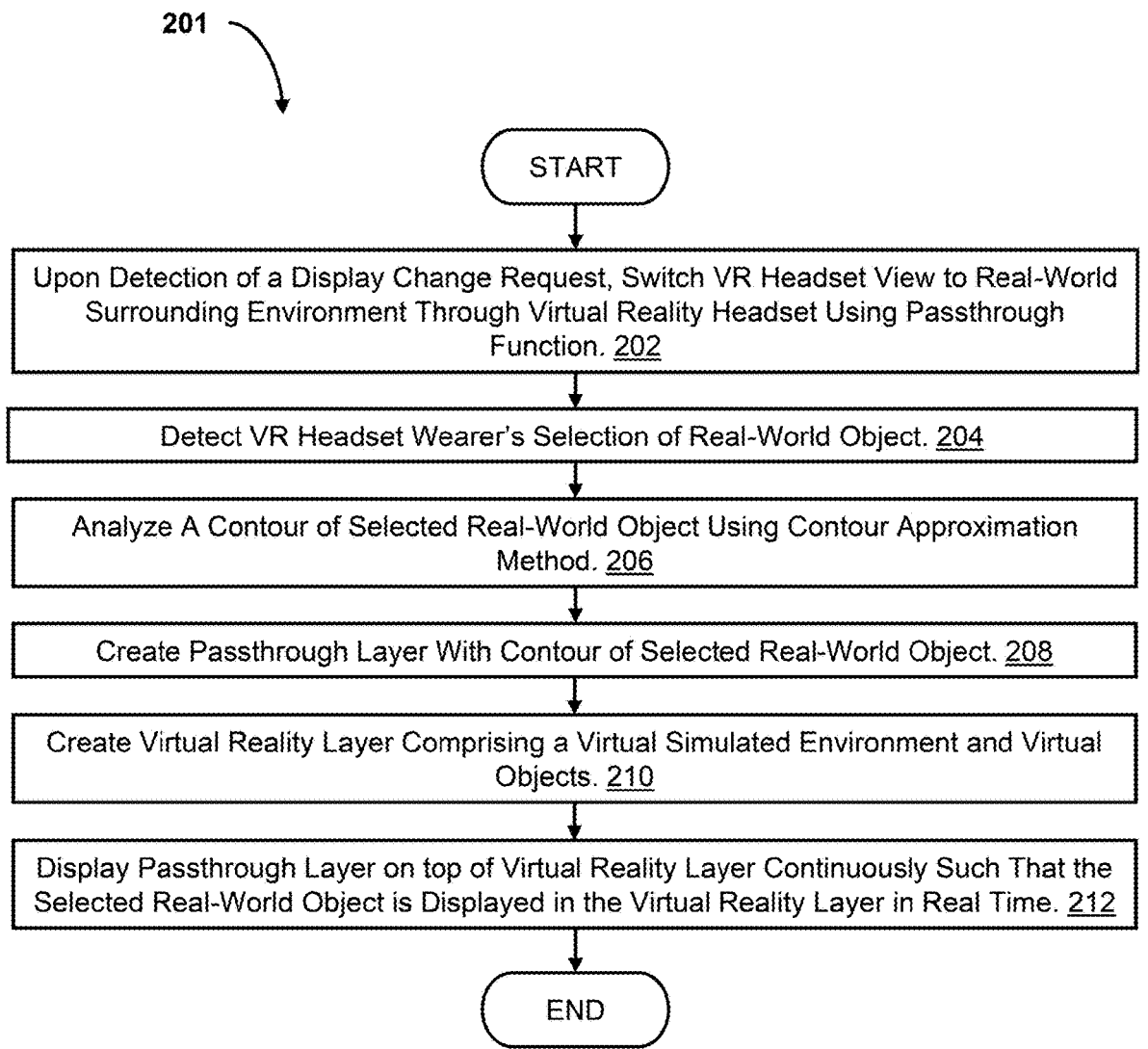

201

START

Upon Detection of a Display Change Request, Switch VR Headset View to Real-World Surrounding Environment Through Virtual Reality Headset Using Passthrough Function. 202

Detect VR Headset Wearer's Selection of Real-World Object. 204

Analyze A Contour of Selected Real-World Object Using Contour Approximation Method. 206

Create Passthrough Layer With Contour of Selected Real-World Object. 208

Create Virtual Reality Layer Comprising a Virtual Simulated Environment and Virtual Objects. 210

Display Passthrough Layer on top of Virtual Reality Layer Continuously Such That the Selected Real-World Object is Displayed in the Virtual Reality Layer in Real Time. 212

END

VR PARTIAL PASSTHROUGH USING CONTOUR APPROXIMATION

BACKGROUND

The present invention relates generally to the field of computing and, in particular, to virtual reality.

Virtual reality ("VR") is a technology that uses software to overlay virtual information onto a created virtual environment and can display the virtual world to person(s) wearing virtual reality headset(s). Virtual reality creates digital environments comprising digital objects, that appear to be real and thus, make a headset wearer feel as if they are immersed in their surroundings. Currently, the majority of VR headsets comprise a passthrough function in which the headset wearer can see their surrounding real-world environment without taking off their headset.

SUMMARY

Embodiments of a method, a computer system, and a computer program product for virtual reality are described. According to one embodiment of the present invention, a method, computer system, and computer program product for virtual reality may include detecting a selection of a real-world object via a passthrough function of a virtual reality headset; analyzing a contour of the selected real-world object via a contour approximation method; creating a first layer that maintains passthrough function within the analyzed contour of the selected real-world object; creating a second layer that comprises a virtual simulated environment and one or more virtual objects; and displaying the first layer on top of the second layer by overwrapping the first layer and the second layer.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment;

FIG. 2 is an operational flowchart illustrating a VR partial passthrough determination process according to at least one embodiment;

DETAILED DESCRIPTION

Figure 3:
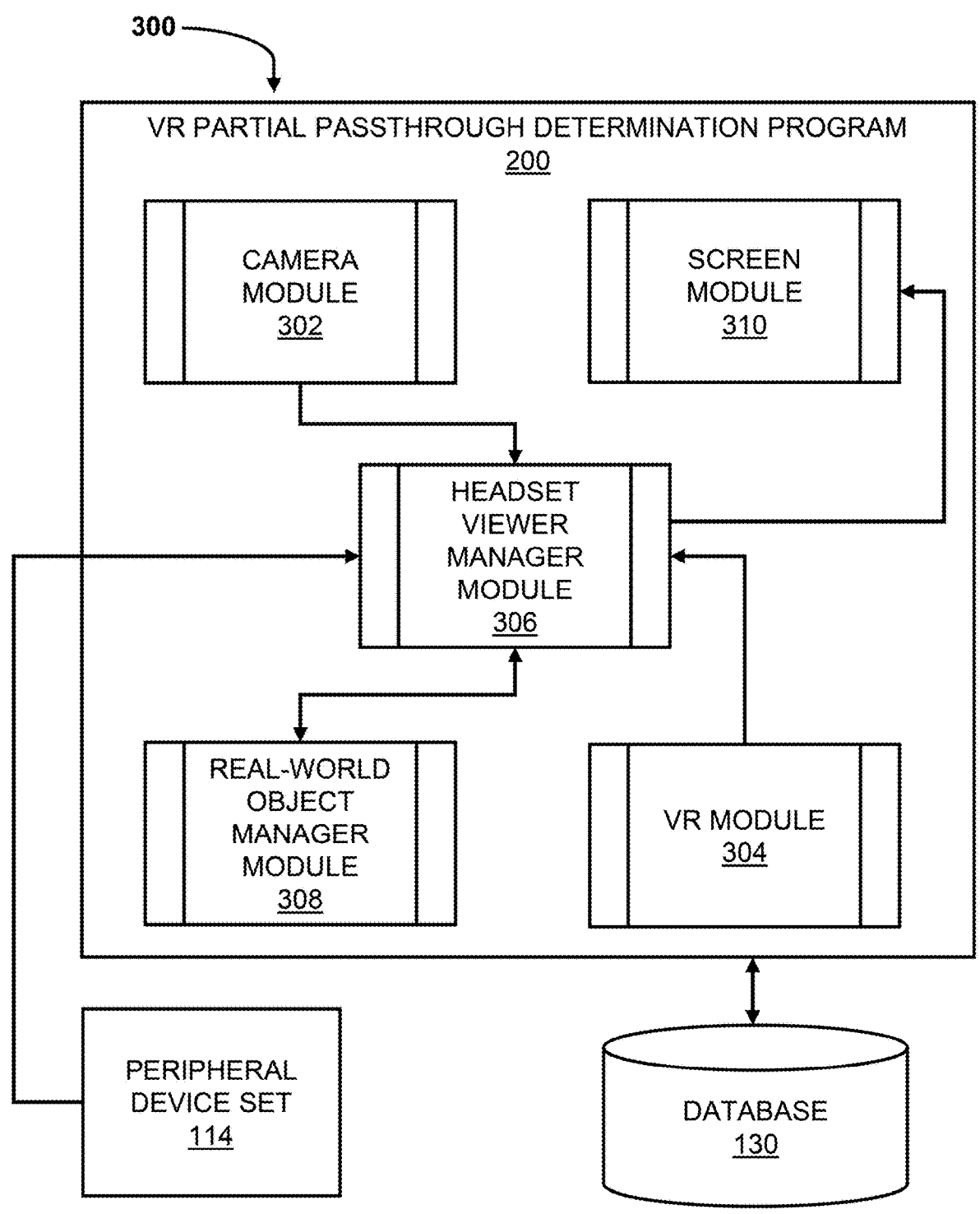
FIG. 3 is a system diagram illustrating an exemplary program environment of an implementation of a VR partial passthrough determination process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to virtual reality. The following described exemplary embodiments provide a method, program product, and system to, among other things, display selected real-world objects in a virtual simulated environment without the need to manually switch between display layers, and without needing to attach real-world objects to a fixed area in the virtual simulated environment or blocking the available display space in the virtual simulated environment. Therefore, the present embodiment has the capacity to improve computers and virtual reality technology by displaying selected real-world objects in a virtual simulated environment, thus giving a VR headset wearer the flexibility to have any real-world object displayed in a virtual simulated environment, and dynamically tracking the movement of the selected real-world objects, thus enabling the objects' positions in the virtual simulated environment to match their respective movements/positions in the VR headset wearer's real-world surrounding environment.

As previously described, virtual reality is a technology that uses software to overlay virtual information onto a created virtual environment and can display the virtual world to a person(s) wearing virtual reality headset(s). Virtual reality creates digital environments comprising digital objects, that appear to be real and thus, make a headset wearer feel as if they are immersed in their surroundings. Currently, the majority of VR headsets comprise a passthrough function in which the headset wearer can see their surrounding real-world environment without taking off their headset. However, VR headset wearers have limited viewing options as they can only view either the virtual simulated environment or their surrounding real-world environment, depending on which view the headset wearer has activated. These limited viewing options can lead to both a less immersive experience for a VR headset wearer and inconvenience for the headset wearer because of having to manually change displays if the VR headset wearer wishes to interact with any real-world objects. Current methods attempt to increase immersiveness by fixing "cut-outs" of areas in the surrounding real-world environment to certain areas within the virtual simulated environment. However, the VR headset wearer does not experience full immersiveness because at least part of the surrounding real-world environment will always be blocking out parts of the virtual simulated environment. Additionally, current methods attempt to increase immersiveness by converting real-world objects to digital objects and displaying the digital version of the real-world object in the virtual simulated environment. However, this method does not allow for tracking of real-time changes in the movements/positions of a real-world object, and thus, those changes cannot be dynamically represented in the virtual simulated environment. Therefore, it may be likely that a VR headset wearer has a poor virtual reality experience because of inaccurate displaying of a real-world object in a virtual simulated environment, a blended virtual simulated environment and real-world surrounding environment that does not capture the immersiveness of a completely virtual simulated environment, and/or having to manually switch views on the VR headset in order to see and interact with real-world objects.

Thus, embodiments of the present invention may provide advantages including, but not limited to, giving a VR headset wearer full flexibility in selecting real-world objects to be shown in a virtual simulated environment, real-time tracking of real-world object changes and dynamic representation of those changes in the virtual simulated environment, and complete immersiveness for the VR headset wearer. The present invention does not require that all advantages need to be incorporated into every embodiment of the invention.

According to at least one embodiment, a selection of a real-world object via the passthrough function of a virtual reality headset may be detected. According to at least one embodiment, in response to detecting a selection of a real-world object via the passthrough function of a virtual reality headset, a contour of the selected real-world object via a contour approximation method may be analyzed. According to at least one embodiment, in response to analyzing the contour of the selected real-world object via a contour approximation method, a first layer that maintains passthrough function within the analyzed contour of the selected real-world object may be created. In response to creating a first layer that maintains passthrough function within the analyzed contour of the selected real-world object, a second layer that comprises a virtual simulated environment and one or more virtual objects may be created. In response to creating a second layer that comprises a virtual simulated environment and one or more virtual objects, the first layer on top of the second layer by over-wrapping the two layers may be displayed.

According to at least one other embodiment, in response to displaying the first layer on top of the second layer by overwrapping the two layers, the selected real-world object in the virtual simulated environment may be continuously displayed, whereby the continuous display of the selected real-world object comprises matching a position of the selected real-world object in the virtual simulated environment to a corresponding position in a real-world surrounding environment.

The present invention may be a system, a method, and/or a computer program product at any possible technical detail level of integration. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product for virtual reality, comprising detecting a selection of a real-world object via the passthrough function of a virtual reality headset, analyzing the contour of the selected real-world object via a contour approximation method, creating a first layer that maintains passthrough function within the analyzed contour of the selected real-world object, creating a second layer that comprises a virtual simulated environment and one or more virtual objects, and displaying the first layer on top of the second layer by overwrapping the two layers.

Beginning now with FIG. 1, an exemplary networked computer environment 100 is depicted, according to at least one embodiment. Computing environment 100 contains an example of an environment for the execution of at least some of the computer code involved in performing the inventive methods, such as virtual reality ("VR") partial passthrough determination code 200, also referred to as VR partial passthrough determination program 200. In addition to code block 200 computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer, or any other form of computer or mobile device now known or to be developed in the future that is capable of running an algorithm, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Additionally, peripheral device set 114 may comprise a virtual reality (VR) device, also referred to as a "VR headset".

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as application-specific integrated circuits ("ASICs"), copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as a thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs, and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the VR partial passthrough determination program 200, "the program", may be a program capable of upon detection of a display change request, switching the VR headset view to a VR headset wearer's real-world surrounding environment, detecting the VR headset wearer's selection of a real-world object, analyzing the contour of the selected real-world object using a contour approximation method, creating a passthrough layer with the contour of the selected real-world object, creating a virtual reality layer comprising a virtual simulated environment and virtual objects, and displaying the passthrough layer on top of the virtual reality layer continuously such that the selected real-world object is displayed in the virtual reality layer in real-time. The program 200 may be located on client computing device 101 or remote server 104 or on any other device located within network 102. Furthermore, the program 200 may be distributed in its operation over multiple devices, such as client computing device 101 and remote server 104. The VR partial passthrough determination program method is explained in further detail below with respect to FIG. 2.

FIG. 2 is an operational flowchart illustrating a VR partial passthrough determination process 201 according to at least one embodiment. At 202, upon detection of a display change request, the program 200 switches the VR headset view to a VR headset wearer's real-world surrounding environment. The program 200 can switch the display of the VR headset via the camera module 302 (FIG. 3) of the VR headset using the VR headset's passthrough function. The program 200 can detect a display change request upon the VR headset initiating a display change request, such as by pressing a button on the VR headset, pressing a button on the VR controller, or making a defined motion via the headset wearer's arms. A display change may comprise changing the VR headset view from the virtual simulated environment to the real-world surrounding environment of the VR headset wearer. A VR headset wearer may be any person who is wearing the VR headset.

A VR device may be any device or combination of devices, such as a headset, enabled to record world information that the VR module 302 (FIG. 3) may overlay with computer-generated perceptual elements to create a VR-simulated environment. The VR device(s) can record the actions, position, movements, etc. of a VR device wearer, to track the VR device wearer's movement within and interactions with the VR environment. The VR device can display a virtual simulated environment to a VR device wearer, allowing the VR device wearer to interact with the VR environment. Also, the VR device can comprise a head-mounted display (HMD). Additionally, the VR device may be equipped with or comprise a number of sensors, such as a camera, microphone, and accelerometer, and these sensors may be equipped with or comprise a number of user interface devices such as touchscreens, speakers, etc. Additionally, the VR device may be equipped with one or more VR controller devices. A VR controller device may be any device that allows a VR headset wearer to interact with VR content. A VR controller device may comprise buttons, thumbsticks, and motion sensors, and are designed to be held in a VR headset wearer's hand.

At 204, the program 200 detects the VR headset wearer's selection of a real-world object, i.e., a physical object. The program 200 can detect and identify real-world objects in a VR device wearer's real-world surrounding environment using object recognition. The program 200 can perform object recognition using artificial intelligence systems such as IBM Watson® (IBM Watson® and all IBM Watson®-based trademarks and logos are trademarks or registered trademarks of International Business Machines Corporation, and/or its affiliates). Object recognition may comprise identifying physical objects in image data received from the VR device wearer's real-world surrounding environment. Specifically, the program 200 can ingest the image data from the VR device through trained machine learning algorithms, such as convolutional neural networks ("CNNs"). The program 200 can save image data and identified physical objects in the database 130.

The program 200 can detect a VR headset wearer's selection of a real-world object via the VR controller device of the VR headset. The VR headset wearer can select a real-world object by pressing a button on the VR controller, or by capturing a defined motion via the headset wearer's hand movements. For example, while wearing the VR device, the VR device wearer may point to a real-world object and the program 200 may detect the selected real-world object based on the physical objects the program 200 previously identified using object recognition.

Additionally, a real-world object may be pre-registered using 3D scanned data. The program 200 can store the registered real-world object and the analyzed contour of the registered real-world object in the database 130. The VR device wearer may select a registered real-world object to display in the virtual simulated environment from a list on the GUI of the VR device.

At 206, the program 200 analyzes the contour of the selected real-world object using a contour approximation method. The program 200 can perform contour approximation using computer vision techniques, such as OpenCV. Using contour approximation, the program 200 can analyze the shape of the selected real-world object to determine the shape, size, dimensions, etc. of the real-world object.

At 208, the program 200 creates a passthrough layer with the contour of the selected real-world object. Based on the analyzed contour of the selected real-world object, the program 200 can create a display layer that maintains passthrough only within the contour of the selected real-world object, i.e., the layer only displays the selected real-world object in the surrounding environment, but none of the surrounding environment is displayed. The program 200 can display only the selected real-world object by cutting an image precisely around the real-world object while performing contour approximation.

At 210, the program 200 creates a virtual reality layer comprising a virtual simulated environment and virtual objects. The program 200 can render virtual objects and a virtual simulated environment via the VR module 304 (FIG. 3) of the virtual reality device. The program 200 may feed data representing a virtual simulated environment and virtual objects to the VR device. The virtual simulated environment may comprise virtual elements. The virtual simulated environment may comprise a virtual world in which one or more VR device wearers may enter, see, move around in, interact with, etc. through the medium of a VR device. The VR device wearers in the virtual simulated environment may be able to see and/or interact with the same virtual objects and virtual elements and may interact with virtual representations of each other. The virtual simulated environment may comprise VR environments such as generated images, sounds, haptic feedback, and other sensations. Additionally, the virtual simulated environment may comprise virtual simulated environments that fully replace a physical environment with virtual elements, such that a VR device wearer experiencing a virtual simulated environment cannot see any objects or elements of the physical world; however, the virtual simulated environments are anchored to real-world locations, such that the movement of the VR device wearers, virtual objects, virtual environmental effects and elements all occur relative to the corresponding locations in the physical environment.

At 212, the program 200 displays the passthrough layer on top of the virtual reality layer continuously such that the selected real-world object is displayed in the virtual reality layer in real-time. The program 200 can display the passthrough layer on top of the virtual reality layer by over-wrapping the layers. The program 200 can continuously determine the position of the selected real-world object using OpenCV, enabling markerless tracking of the real-world world object and dynamic contour analysis of the real-world object. The program 200 can continuously display the selected real-world object in the virtual simulated environment, whereby the continuous display of the selected real-world object comprises matching the selected real-world object's position in the virtual simulated environment to its corresponding position in a real-world surrounding environment. The program 200 can display the layers on the VR device via the screen module 310 (FIG. 3).

Additionally, the program 200 can display one or more body parts of a virtual headset wearer, such as the fingers or a hand of the wearer, near the selected real-world object, so as to prevent discrepancies between what a wearer is seeing in the virtual simulated environment and what the user is feeling in the real-world surrounding environment. For example, if a VR headset wearer is grabbing a physical cup in the real-world surrounding environment, the VR headset wearer's hand may be visible in the virtual simulated environment along with the physical cup.

In the case of misalignment/mismatch between the ground of the real-world surrounding environment and the ground of the virtual reality simulated environment, the program 200 may use an object position adjuster within the headset viewer manager module 306 (FIG. 3) to adjust the position, height, etc. of the ground of the virtual objects in the virtual simulated environment to the ground of the real-world surrounding environment.

In some embodiments, the program 200 may highlight the selected real-world object that is displayed in the passthrough layer, such that if a VR headset wearer could not locate the real-world object, the program 200 may use arrows or a color highlight to point out the position of the selected real-world object in the passthrough layer. The program 200 can use pattern recognition to determine the position of the selected real-world object. A VR headset wearer may select a prompt on the GUI, such as "Locate Selected Real-World Object" to initiate this process.

Referring now to FIG. 3, a system diagram illustrating an exemplary program environment 300 of an implementation of a VR partial passthrough determination process 201 is depicted according to at least one embodiment. Here, the program 200 comprises a camera module 302, a virtual reality module 304, a headset viewer manager module 306, real-world object manager module 308, and a screen module 310. The exemplary program environment 300 details the interactions between the camera module 302 and the headset viewer manager module 306, the VR module 304 and the headset viewer manager module 306, the real-world object manager module 308 and the headset viewer manager module 306, and the screen module 310 and the headset viewer manager module 306. Additionally, the exemplary program environment 300 details the interactions between the headset viewer manager module 306 and the peripheral device set 114, and the VR partial passthrough determination program 200 and the database 130.

Figure 4:
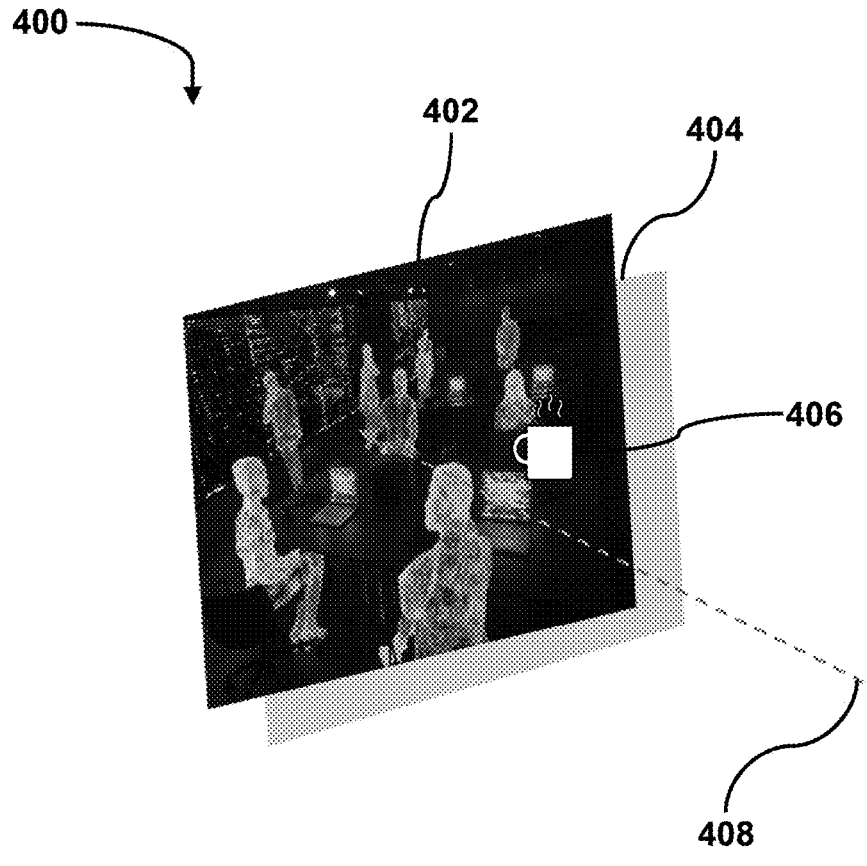
FIG. 4 is an illustration of a passthrough layer over-wrapped on top of a virtual reality layer according to at least one embodiment.

The camera module 302 may be used to display the passthrough layer 404 (FIG. 4) and the real-world object 406 (FIG. 4). The screen module 310 may be used to output the passthrough layer 404 (FIG. 4) displayed on top of the VR layer 402 (FIG. 4), along with the contoured real-world object 406 (FIG. 4). The VR module 304 may be used to create and manage the virtual simulated environment in the virtual reality layer 402 (FIG. 4) and VR objects within the virtual simulated environment. The headset viewer manager module 306 may be used to position the passthrough layer 404 (FIG. 4) and the real-world object 406 (FIG. 4) on top of the VR layer 402 (FIG. 4). Additionally, the headset viewer manager module 306 may be used to manage the position of the real-world object 406 (FIG. 4) in the passthrough layer 404 (FIG. 4), for example, by adjusting the position of the real-world object in real-time. The headset viewer manager module 306 may comprise a viewer layer manager and an object position adjuster. The real-world object manager module 306 may be used to identify real-world objects, analyze and calculate the contour of the real-world object 406 (FIG. 4), and store digital forms of real-world objects and other information about real-world objects. The real-world object manager module 308 may comprise a real-world object contour analyzer, real-world object storage, and an object identifier.

Referring now to FIG. 4, an illustration 400 of a passthrough layer 404 displayed on top of a virtual reality layer 402 is depicted according to at least one embodiment.

Additionally, a real object 406 in the passthrough layer 404 is depicted. Also, a VR headset wearer's line of sight 408 is shown.

It may be appreciated that FIGS. 2 through 4 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for virtual reality, the method comprising:
    detecting a selection of a real-world object, by a user, via a passthrough function of a virtual reality headset;
    analyzing a contour of the selected real-world object via a contour approximation method;
    creating a first layer that maintains passthrough function within the analyzed contour of the selected real-world object, wherein the creating the first layer includes cutting an image of the selected real-world object precisely around a border of the selected real-world object during the analyzing;
    creating a second layer that comprises a virtual simulated environment and one or more virtual objects;
    displaying the first layer on top of the second layer by overwrapping the first layer and the second layer; and
    continuously displaying the selected real-world object in the virtual simulated environment, wherein the continuous display of the selected real-world object comprises matching a position of the selected real-world object in the virtual simulated environment to a corresponding position in a real-world surrounding environment.

2. The method of claim 1, further comprising:
    adjusting a position of a virtual ground of the second layer, upon detection of a mismatch between the virtual ground of the second layer and a real-world ground of the real-world surrounding environment, wherein the adjusting changes the virtual ground of the second layer to match the real-world ground.

3. The method of claim 1, further comprising:
    identifying one or more real-world objects in a real-world surrounding environment using object recognition.

4. The method of claim 1, wherein the detecting of the selection of a real-world object via the passthrough function of the virtual reality headset further comprises a selection of a pre-registered real-world object.

5. The method of claim 1, wherein the continuously displaying of the selected real-world object in the virtual simulated environment further comprises displaying one or more body parts of a virtual headset wearer.

6. The method of claim 1, wherein the continuously displaying of the selected real-world object in the virtual simulated environment further comprises highlighting the selected real-world object in the passthrough layer using pattern recognition.

7. A computer system for virtual reality, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

detecting a selection of a real-world object, by a user, via a passthrough function of a virtual reality headset;

analyzing a contour of the selected real-world object via a contour approximation method;

creating a first layer that maintains passthrough function within the analyzed contour of the selected real-world object, wherein the creating the first layer includes cutting an image of the selected real-world object precisely around a border of the selected real-world object during the analyzing;

creating a second layer that comprises a virtual simulated environment and one or more virtual objects;

displaying the first layer on top of the second layer by overwrapping the first layer and the second layer; and continuously displaying the selected real-world object in the virtual simulated environment, wherein the continuous display of the selected real-world object comprises matching a position of the selected real-world object in the virtual simulated environment to a corresponding position in a real-world surrounding environment.

8. The computer system of claim 7, further comprising:

adjusting a position of a virtual ground of the second layer, upon detection of a mismatch between the virtual ground of the second layer and a real-world ground of the real-world surrounding environment, wherein the adjusting changes the virtual ground of the second layer to match the real-world ground.

9. The computer system of claim 7, further comprising:

identifying one or more real-world objects in a real-world surrounding environment using object recognition.

10. The computer system of claim 7, wherein the detecting of the selection of a real-world object via the passthrough function of the virtual reality headset further comprises a selection of a pre-registered real-world object.

11. The computer system of claim 7, wherein the continuously displaying of the selected real-world object in the virtual simulated environment further comprises displaying one or more body parts of a virtual headset wearer.

12. The computer system of claim 7, wherein the continuously displaying of the selected real-world object in the virtual simulated environment further comprises highlighting the selected real-world object in the passthrough layer using pattern recognition.

13. A computer program product for virtual reality, the computer program product comprising:

one or more computer-readable tangible storage medium and program instructions stored on at least one of the one or more tangible storage medium, the program instructions executable by a processor to cause the processor to perform a method comprising:

detecting a selection of a real-world object, by a user, via a passthrough function of a virtual reality headset;

analyzing a contour of the selected real-world object via a contour approximation method;

creating a first layer that maintains passthrough function within the analyzed contour of the selected real-world object, wherein the creating the first layer includes cutting an image of the selected real-world object precisely around a border of the selected real-world object during the analyzing;

creating a second layer that comprises a virtual simulated environment and one or more virtual objects;

displaying the first layer on top of the second layer by overwrapping the first layer and the second layer; and continuously displaying the selected real-world object in the virtual simulated environment, wherein the continuous display of the selected real-world object comprises matching a position of the selected real-world object in the virtual simulated environment to a corresponding position in a real-world surrounding environment.

14. The computer program product of claim 13, further comprising:

adjusting a position of a virtual ground of the second layer, upon detection of a mismatch between the virtual ground of the second layer and a real-world ground of the real-world surrounding environment, wherein the adjusting changes the virtual ground of the second layer to match the real-world ground.

15. The computer program product of claim 13, further comprising:

identifying one or more real-world objects in a real-world surrounding environment using object recognition.

16. The computer program product of claim 13, wherein the detecting of the selection of a real-world object via the passthrough function of the virtual reality headset further comprises a selection of a pre-registered real-world object.

17. The computer program product of claim 13, wherein the continuously displaying of the selected real-world object in the virtual simulated environment further comprises displaying one or more body parts of a virtual headset wearer.

* * * * *